(12) United States Patent
Bosko

(10) Patent No.: US 6,423,212 B1
(45) Date of Patent: Jul. 23, 2002

(54) MICROBIAL RESISTANT WATER PURIFICATION AND COLLECTION SYSTEM

(75) Inventor: Robert S. Bosko, San Antonio, TX (US)

(73) Assignee: Lancer Partnership Ltd., San Antonio, TX (US)

( * ) Notice: Subject to any disclaimer, the term of this patent is extended or adjusted under 35 U.S.C. 154(b) by 0 days.

(21) Appl. No.: 09/773,381

(22) Filed: Jan. 31, 2001

(51) Int. Cl.[7] ............................................. B01D 65/02
(52) U.S. Cl. ................ 210/108; 210/110; 210/120; 210/136; 210/257.1; 210/258; 210/321.69
(58) Field of Search ................................ 210/108, 110, 210/116, 97, 120, 257.1, 257.2, 136, 258, 321.65, 321.69; 251/12

(56) References Cited

U.S. PATENT DOCUMENTS

| | | | | |
|---|---|---|---|---|
| 3,786,924 A | * | 1/1974 | Huffman | |
| 5,039,411 A | * | 8/1991 | Miller et al. | |
| 5,256,279 A | * | 10/1993 | Voznick et al. | |
| 5,445,729 A | * | 8/1995 | Monroe et al. | |
| 5,658,457 A | * | 8/1997 | Schoenmeyr | |

* cited by examiner

Primary Examiner—Joseph W. Drodge
Assistant Examiner—Terry K. Cecil
(74) Attorney, Agent, or Firm—Christopher L Makay

(57) ABSTRACT

A microbial resistant water purification and collection system includes a reverse osmosis filter assembly 19 having a filter inlet in selective fluid communication with a system inlet and a filter outlet in fluid communication with a water storage container 12 for storing filtrate. At least a portion of the storage container is located at an elevation above the filter membrane such that filling of the storage container creates a head pressure in the storage container relative to the filter membrane to enable a backflow of filtrate therethrough. A mechanical shut-off valve 27 is interposed the system inlet 11 and the filter inlet to block fluid communication therebetween, wherein activation of the shut-off valve occurs by the physical contact thereof with the storage container upon reaching a minimum head pressure in the storage container relative to the filter membrane.

17 Claims, 5 Drawing Sheets

MICROBIAL RESISTANT WATER PURIFICATION AND COLLECTION SYSTEM

FIELD OF THE INVENTION

The present invention relates to water filtration. More particularly, the invention relates to a reverse osmosis water filtration system wherein gentle periodic back pressure across the filter membrane is utilized to avoid the aggregation of microbial bioburden within the filtration system.

BACKGROUND OF THE INVENTION

The need to control microbial bioburden has led to point-of-use bacterial sterilization using filter membranes to remove particles and bacteria from various fluids. It is important, however, that the utilized filter membranes be regularly maintained in order to prevent the buildup of microbial biological fouling on the upstream side of the filter membrane. In reverse osmosis filter technology, such regular maintenance generally entails the replacement of the reverse osmosis filter membrane and/or the entire reverse osmosis filter assembly. Unfortunately, depending upon the remoteness of the filter implementation or the skill level of the user, the filter assembly may be neglected, ultimately resulting in failure or even health hazard.

Because microbial bioburden is most prevalent in stagnant water, Applicant has found it desirable to implement extra precaution against the biological fouling of reverse osmosis filter membranes. To this end, it is an object of the present invention to provide a reverse osmosis filter system wherein there is provided a continuous flow of water across the filter membrane. Contrary to the general state of the art, this requires the back flow of filtered water across the filter membrane. Although U.S. Pat. No. 5,658,457 issued Aug. 19, 1997 to Schoenmeyr ("Schoenmeyr") at least contemplates such a back flow for the purpose of particle removal, Schoenmeyr falls short of enabling a system capable of resisting microbial buildup. In particular, Schoenmeyr fails to provide sufficient back flow pressure at the time of forward flow shut-off as necessary for actual reverse flow across the membrane. As a result, the apparatus of Schoenmeyr is susceptible to the buildup of biological material. It is therefore an overriding object of the present invention to improve upon the prior art by providing a reverse osmosis filter system that provides for the continuous flow of water across the reverse osmosis membrane, thereby greatly diminishing the opportunity for the aggregation of biological fouling.

SUMMARY OF THE INVENTION

In accordance with the foregoing objects, the present invention—a microbial resistant water purification and collection system—generally comprises a reverse osmosis filter assembly having a filter inlet in selective fluid communication with a system inlet and a filter outlet in fluid communication with a water storage container. The filter inlet is separated from the filter outlet by a filter membrane. At least a portion of the storage container is located at an elevation above the filter membrane such that filling of the storage container creates a head pressure in the storage container relative to the filter membrane.

A shut-off valve is interposed the system inlet and the filter inlet to block fluid communication from the system inlet to the filter inlet upon reaching a minimum head pressure in the storage container relative to the filter membrane. In the preferred embodiment of the present invention, the minimum head pressure is at least 0.5 pounds per square inch in order to ensure back flow across the membrane upon shut-off to the filter assembly of the source water.

The water storage container preferably comprises a substantially freely expandable and substantially freely collapsible, flexible bag while the shut-off valve preferably comprises a mechanical valve, actuated by the filling of the flexible bag. In particular, the mechanical valve comprises a valve inlet, a valve outlet and a plunger, depression of the plunger operating to block fluid flow from the valve inlet to the valve outlet. To this end, the shut-off valve further comprises a lever arranged between the mechanical valve and the flexible bag such that the lever is adapted to depress the plunger upon substantial filling of the flexible bag.

In at least one embodiment of the present invention, the reverse osmosis filter assembly is located in a space entirely beneath the storage container, thereby providing maximum head pressure to the filter membrane. In this embodiment, the filter outlet communicates with the storage container through a container inlet in a base portion of the storage container. The same inlet may also then double as an outlet for the water collected in the storage container. To this end, a transfer pump, which may be demand activated, gas powered, remotely switched or a combination thereof, may also be provided for delivery of the water.

A booster pump may be interposed the system inlet and the filter inlet for low source pressure applications. In this case, a shut-off switch adapted to interrupt electrical power to the booster pump upon substantial filling of the storage container is also provided. Preferably, the shut-off switch is actuated by the same lever as controls flow to the filter assembly. Additionally, a clean water inlet for collection of water other than through the filter assembly may be provided. In this case, a pressure relief, having an integral check valve, is provided for release from the collected water of gasses such as carbon dioxide.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein.

DETAILED DESCRIPTION OF THE PREFERRED EMBODIMENT

Figure 1:
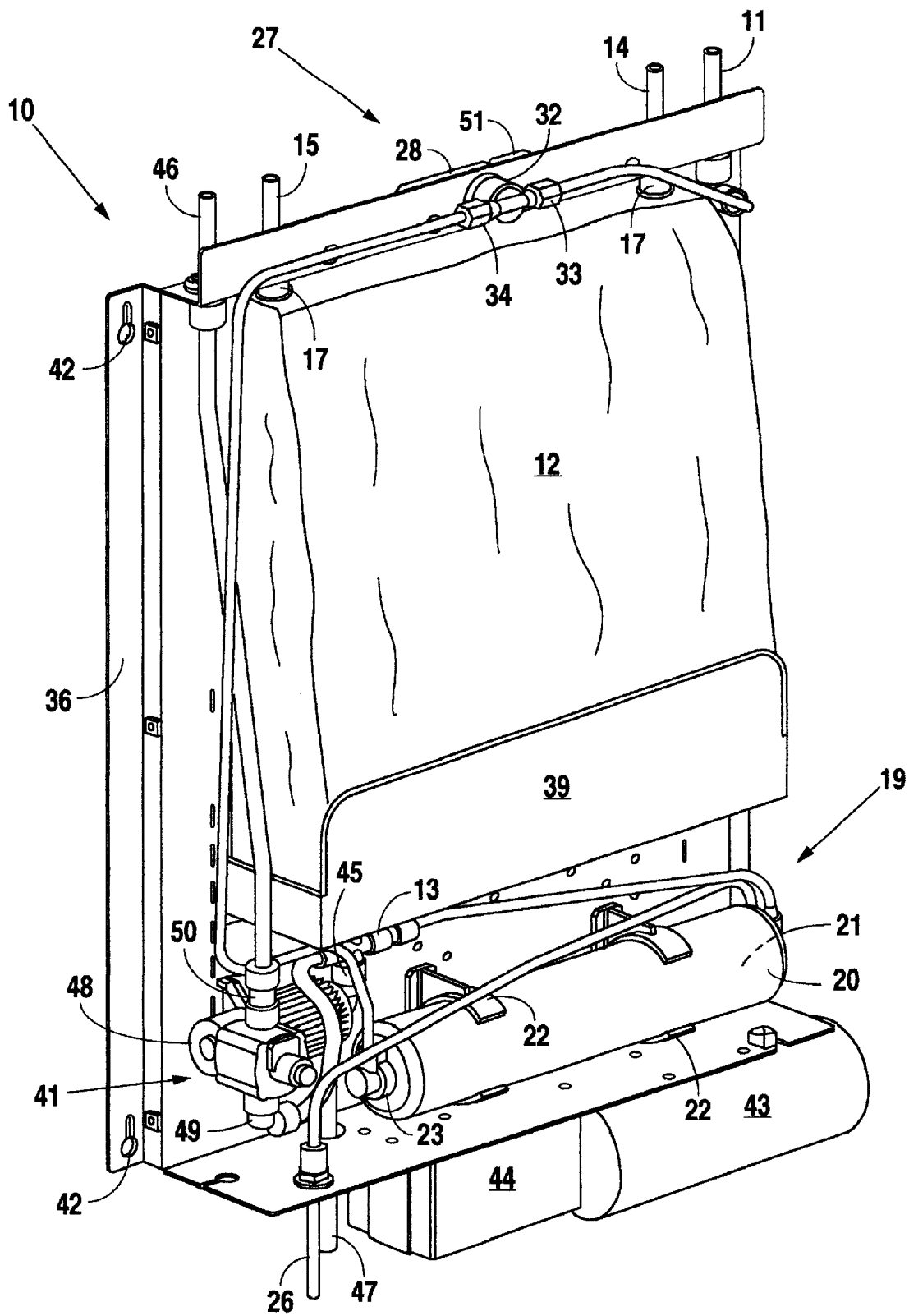
FIG. 1 shows, in a front perspective view, the preferred embodiment of the water purification and collection system of the present invention.

Although those of ordinary skill in the art will readily recognize many alternative embodiments, especially in light of the illustrations provided herein, this detailed description is exemplary of the preferred embodiment of the present invention, the scope of which is limited only by the claims appended hereto.

Referring now to the figures, the water purification and collection system 10 of the present invention is shown to generally comprise a storage container 12, for holding filtered or otherwise clean water, and a reverse osmosis ("R/O") filter assembly 19 located, for reasons that will be apparent further herein, in a container subspace 41 beneath the storage container 12. An automatic shut-off valve assembly 27 is provided to control the flow, through an unfiltered water inlet 11, of water to the water purification and collection system 10. As will be better understood further herein, this flow is controlled according to the amount of water in the storage container 12. As also will be better understood further herein, the specific arrangement of the foregoing components enables the automatic and periodic back flush cleansing of an R/O membrane 21 encapsulated within a membrane vessel 20 of the R/O filter assembly 19.

Figure 2:
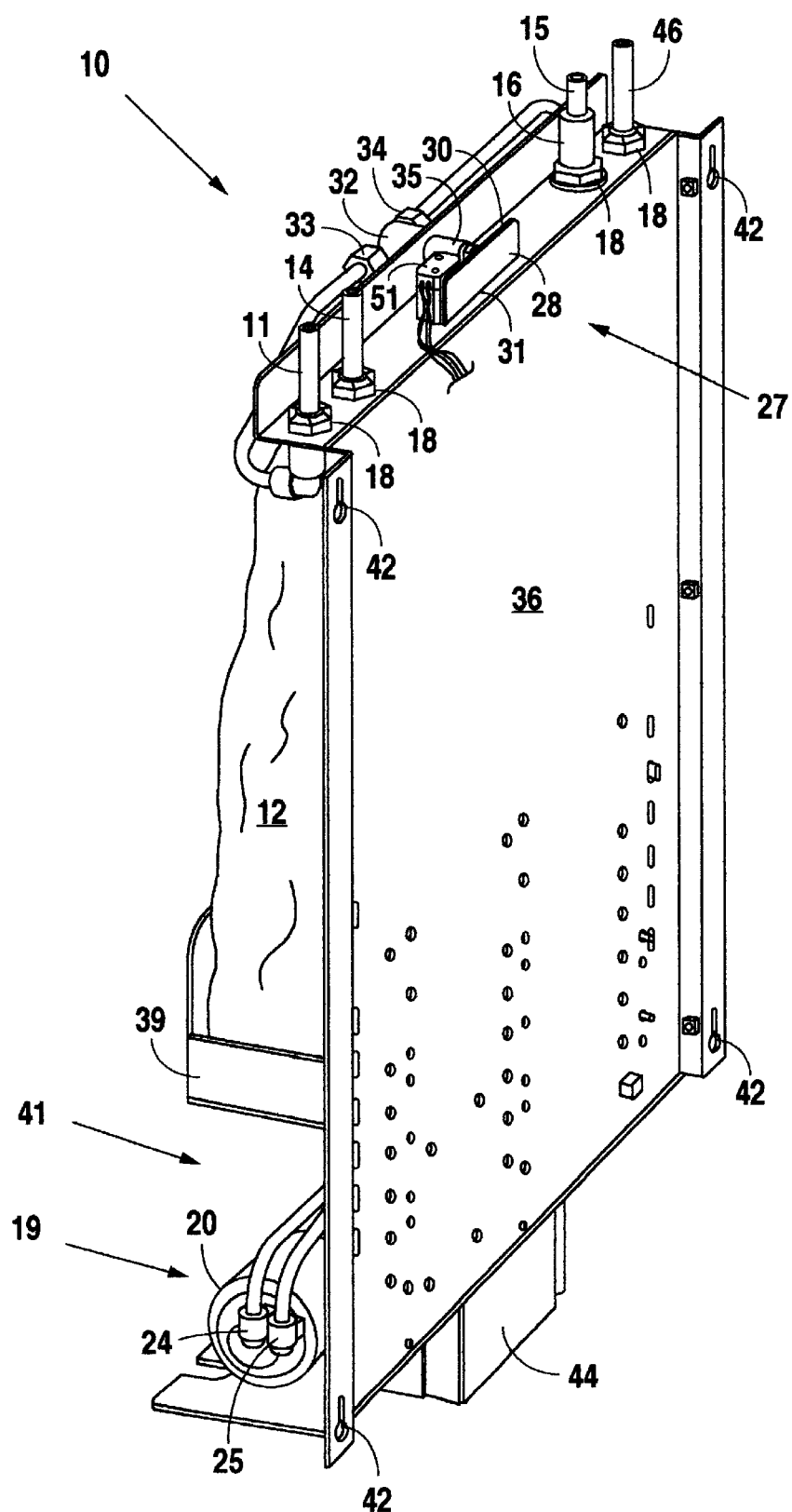
FIG. 2 shows, in a rear perspective view, the water purification and collection system of FIG. 1.

As particularly shown in FIGS. 1 and 2, the storage container 12 preferably comprises a freely expandable and freely collapsible, flexible plastic bag. Filtered water from the R/O filter assembly 19 may enter the storage container through a combination filtered water inlet and clean water outlet 13. Similarly clean water returned from other devices may enter the storage container 12 through a clean water inlet 14. An overflow and pressure relief outlet 15 is provided to ensure that the storage container 12 does not become excessively filled. Additionally, because water processed through the reverse osmosis membrane may have trace concentrations of $CO_2$ and other gasses—causing the formation of acid solutions in the permeate, the overflow and pressure relief outlet 15 is further provided to allow such gases to freely escape out of the stored water at atmospheric pressure. In this manner the stored water returns quickly to a normal pH level and is thereafter maintained in a non-aggressive state. In order to preserve the integrity of the water, however, the overflow and pressure relief outlet 15 is preferably provided with an integral, one-way check valve 16.

Figure 3:
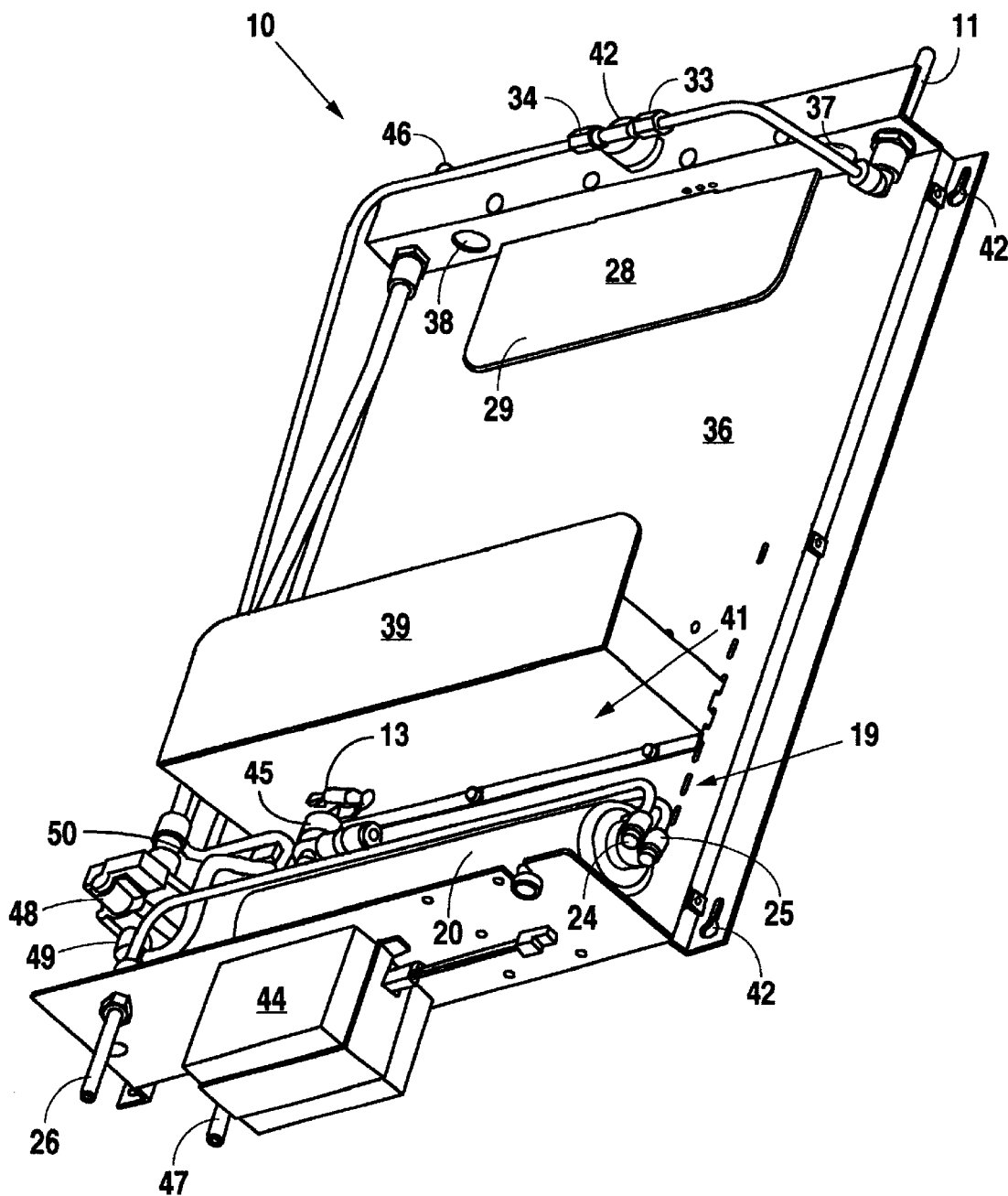
FIG. 3 shows, in a bottom perspective view, the water purification and collection system of FIG. 1.

As shown in FIGS. 1 through 3, the clean water inlet 14 and overflow and pressure relief outlet 15 serve to dependently affix the storage container 12 to the chassis 36 of the water purification and collection system 10. To this end, the storage container is provided with a plurality of integral bag fittings 17 adapted to mate, through a clean water inlet aperture 37 and an overflow and pressure relief outlet aperture 38, with couplings 18 on the clean water inlet 14 and overflow and pressure relief outlet 15. Likewise, a bag fitting 17 is provided to mate, through a filtered water inlet and clean water outlet aperture 40, with a coupling 18 on the combination filtered water inlet and clean water outlet 13, thereby securing the lower portion of the storage container 12 to a container shelf 39 mounted to the chassis 36.

The R/O filter assembly 19 of the present invention generally comprises an R/O membrane 21, encapsulated within a vessel 20, and plurality of membrane vessel mounting brackets 22. In a critical aspect of the present invention, the membrane vessel mounting brackets 22 are affixed to the chassis 36 in such a manner as to secure the membrane vessel 20 in a horizontal orientation in the container subspace 41 beneath the container shelf 39. In this manner, as will be better understood further herein, a sufficient head pressure of water in the storage container 12 may be achieved to enable back flush cleansing of the R/O membrane 21 during any time that flow of unfiltered water to the water purification and collection system 10 is interrupted by the automatic shut-off valve assembly 27. Because, contrary to conventional practice in the art, the present invention contemplates allowing clean water to flow back into the membrane vessel 20 through the filtered water outlet 24 during such periods, it is also critical to the present invention that the membrane vessel 20 be modified to accommodate this flow. In particular, it is necessary to omit the check valve ordinarily provided within a membrane vessel, which would otherwise prevent the return flow of water through the filtered water outlet 24 to the R/O membrane 21.

For implementation of the present invention, Applicant has found that a 100 gallon per day encapsulated nanofiltration membrane module may be utilized in the R/O filter assembly 19. Although those of ordinary skill in the art will recognize other substantial equivalents, Applicant predicts that this implementation will allow membrane performance achieving 85 to 90% sodium chloride rejection and 95 to 98% divalent rejection, so long as recovery is maintained at about 4 or 5 to 1. As in other R/O implementations, a reject water drain 26 is provided in fluid communication with a reject water outlet 25 from the membrane vessel 20. Preferably, the reject water drain 26 is provided with a trademark "TEFLON" capillary flow restrictor.

As particularly shown in FIGS. 2 through 5, the automatic shut-off valve assembly 27 of the present invention generally comprises a normally open valve 32 adapted to be mechanically operated through a paddle 28 according to the level of water within the storage container 12. As shown in the figures, normal flow of unfiltered water is through the unfiltered water inlet 11 to an inlet 33 on the valve 32 via interposed tubing. So long as the storage container 12 is not full or nearly full, water flows freely through the valve 32 and out of an outlet 34 through plastic tubing to an unfiltered water inlet 23 on the membrane vessel 20. Clean water then crosses the R/O membrane 21 and flows from the filtered water outlet 24 of the membrane vessel 20, through provided plastic tubing and a four-way union 45, the purpose of which will be more apparent further herein, and into the storage container 12 through the combination filtered water inlet and clean water outlet 13. As in other R/O implementations, reject water that does not pass across the R/O membrane 21 flows from the reject water outlet 25 of the membrane vessel 20 and through the flow-restricted reject water drain 26.

When the storage container 12 becomes full, the paddle 28, which acts as a lever across a fulcrum 31 formed in the chassis 36, serves to close the valve 32. Specifically, as the flexible storage container 12 fills, horizontal pressure is exerted against the extended arm 29 of the paddle 28 resulting in depression of a plunger 35, integral with the valve 32, through the lever action of the actuating arm 30 of the paddle 28 across the fulcrum 31. Depression of the plunger 35 closes the valve 32, interrupting water flow to the R/O membrane vessel 20. Although those of ordinary skill in the art will recognize many possible variations, Applicant has found it preferable to adapt the automatic shut-off valve assembly 27 such that about 40 psi pressure against the plunger 35 is created upon filling of the storage container 12. In this manner, utilizing a readily available commercial diaphragm valve, about 60 psi line pressure may easily be interrupted.

As previously described, the storage container 12 of the present invention generally comprises a freely expandable and freely collapsible, flexible plastic bag. According to the preferred implementation of the present invention, the storage container 12 is sized to hold approximately 5 gallons of water. Additionally, the automatic shut-off valve assembly 27 is adapted to close the valve 32 as the storage container is filled to approximately 80% capacity (approximately 4 gallons). In this manner, a head pressure of approximately 0.5 to 1 psi is created to produce a gentle back pressure across the R/O membrane 21 within the membrane vessel 20 at any time that the storage container 12 is full. Although it is critical to the present invention to orient the membrane vessel, as shown in the figures, in the container subspace 41 in order to produce sufficient back pressure across the R/O membrane 21 for cleaning, excessive head pressure must be avoided. To this end, the implementing engineer is cautioned to maintain the back pressure at or below 5 psi in order to prevent delaminating of the R/O membrane 21.

As previously mentioned, a four-way union 45 is provided in the fluid connection between the R/O filter assembly 19 and the combination filtered water inlet and clean water outlet 13 interfacing with the storage container 12. In this manner, the single opening to the storage container 12 may be utilized for filling of the storage container 12 as well as dispensing of the clean water therefrom. To this end, one connection from the four-way union 45 is placed in fluid communication with an inlet 49 of a transfer pump 48. The outlet 50 from the transfer pump 48 is then connected to a pump clean water outlet 46. In the preferred embodiment of the present invention, the transfer pump 48 comprises a pressure switch operated, intermittent duty cycle, self priming, positive displacement pump. Such a pump is commercially available from the Shurflo Pump Mfg. Co. of Santa Anna, Calif. under their model number 402-140-033. As will be appreciated by those of ordinary skill in the art, the pumped clean water outlet 46 may then be connected to such devices as may demand clean water, but lack internal pumping apparatus. For the provision of clean water to devices having an internal pump, the remaining connection to the four-way union 45 is fluidly connected directly to a gravity flow clean water outlet 47.

In an alternative to the demand activated transfer pump 48, however, those of ordinary skill in the art will recognize that a gas operated pump my be conveniently used in those applications where the water purification and collection system 10 of the present invention is utilized with soda machines and the like. In such an application, a portion of the carbonating gas is simply diverted to drive the transfer pump. Likewise, a lower-cost impeller or turbine pump may be utilized by providing a remote actuator switch. In one implementation, such a remote switch may comprise a magnetic reed switch place in proximity to the solenoid coil operating an inlet valve to a user machine. Actuation of the solenoid will cause closure of the reed switch and operation of the transfer pump notwithstanding the fact that no actual interface wiring to the user machine need be provided.

Figure 4:
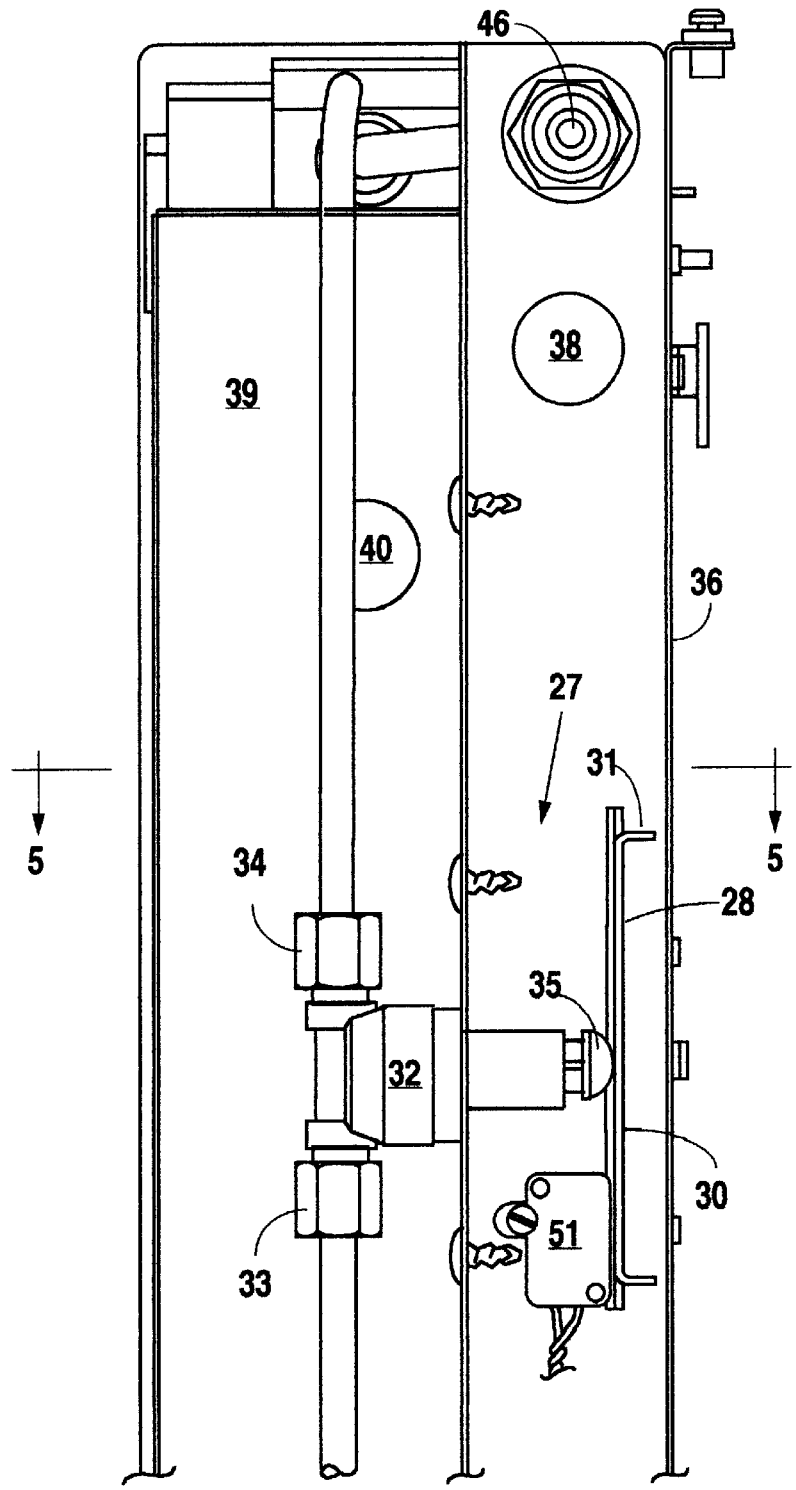
FIG. 4 shows, in a partially cut away top plan view, certain details of the automatic shut-off valve of the water purification and collection system of FIG. 1.
Figure 5:
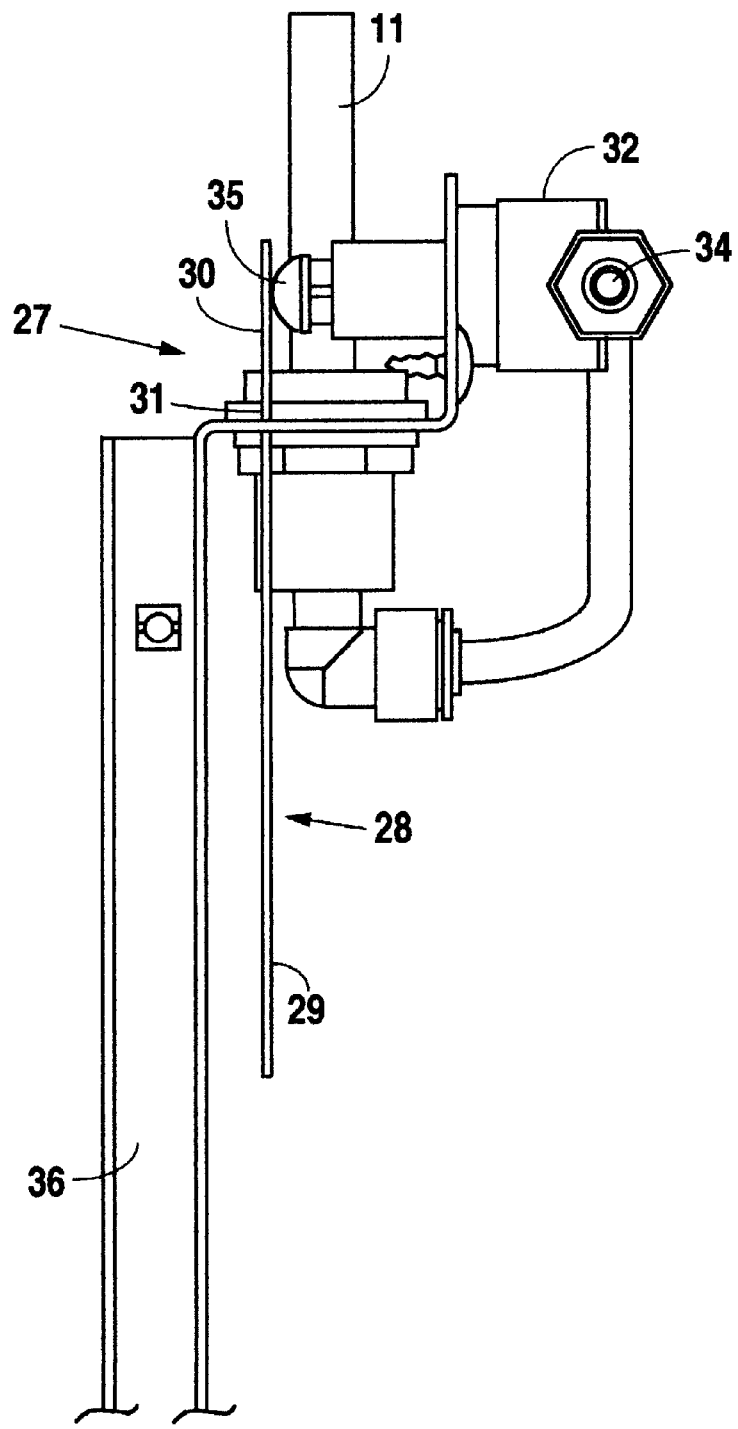
FIG. 5 shows, in a partially cut away cross-sectional view taken through line 5—5 in FIG. 4, certain other details of the automatic shut-off valve of the water purification and collection system of FIG. 1.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. For example, a booster pump 43 may be provided between the unfiltered water inlet 11 and the R/O filter assembly 19 for use in low-pressure applications wherein there may lack sufficient forward pressure for operation of the R/O filter assembly 19. In this case, a normally closed mini switch 51 is also provided, as shown in FIGS. 1, 2 and 4, for controlling delivery of power to the booster pump 43 according tot the level of water in the storage container 12. In particular, as the storage container 12 becomes full, the paddle 28 operates against the booster pump switch 51 to open the switch 51, thereby interrupting electrical power from the power source 44 to the booster pump 43.

Likewise a power source 44, such as a battery pack or alternating current adapter, may be provided for operation of the transfer pump 48 and/or the booster pump 43. Additionally, the chassis 36 is preferably provided with a plurality of mounting slots 42, whereby the water purification and collection system 10 of the present invention may be readily mounted to a frame, a wall, a related device or the like. In any case, because the scope of the present invention is much broader than any particular embodiment, the foregoing detailed description should not be construed as a limitation of the scope of the present invention, which is limited only by the claims appended hereto.

What is claimed is:

1. A microbial resistant water purification and collection system, said system comprising:

a reverse osmosis filter assembly having a filter inlet in selective fluid communication with a system inlet and a filter outlet, said filter inlet and said filter outlet being separated by a filter membrane;

a water storage container in fluid communication with said filter outlet and adapted to store filtrate, at least a portion of said storage container being located at an elevation above said filter membrane such that filling of said storage container creates a head pressure in said storage container relative to said filter membrane to enable a backflow of filtrate therethrough; and a mechanical shut-off valve interposed said system inlet and said filter inlet, said shut-off valve being adapted to block fluid communication from said system inlet to said filter inlet, activation of said shut-off valve occurring by physical contact thereof with said storage container upon reaching a minimum head pressure in said storage container relative to said filter membrane, said minimum head pressure being at least 0.5 pounds per square inch.

2. The water purification and collection system as recited in claim 1, wherein said water storage container comprises a flexible bag.

3. The water purification and collection system as recited in claim 2, wherein said flexible bag is substantially freely expandable and substantially freely collapsible.

4. The water purification and collection system as recited in claim 2, wherein said shut-off valve comprises a valve inlet, a valve outlet and a plunger, depression of said plunger operating to block fluid flow from said valve inlet to said valve outlet.

5. The water purification and collection system as recited in claim 4, wherein said shut-off valve further comprises a lever, said lever being arranged adjacent said flexible bag such that said lever is adapted to depress said plunger upon substantial filling of said flexible bag.

6. The water purification and collection system as recited in claim 5, wherein said reverse osmosis filter assembly is located in a space entirely beneath said storage container.

7. The water purification and collection system as recited in claim 6, wherein said filter outlet communicates with said storage container through a container inlet in a base portion of said storage container.

8. The water purification and collection system as recited in claim 5, said system further comprising a booster pump interposed said system inlet and said filter inlet.

9. The water purification and collection system as recited in claim 8, said system further comprising a booster pump shut-off switch, said booster pump shut-off switch being adapted to interrupt electrical power to said booster pump upon substantial filling of said storage container.

10. The water purification and collection system as recited in claim 9, wherein said booster pump shut-off switch is actuated by said lever.

11. The water purification and collection system as recited in claim 5, said system further comprising a transfer pump for delivery of water from said storage container.

12. The water purification and collection system as recited in claim 11, wherein said transfer pump is demand activated.

13. The water purification and collection system as recited in claim 11, wherein said transfer pump is gas powered.

14. The water purification and collection system as recited in claim 11, wherein said transfer pump is remotely switched.

15. The water purification and collection system as recited in claim 5, wherein said storage container further comprises a clean water inlet for collection of water other than through said filter assembly.

16. The water purification and collection system as recited in claim 15, wherein said storage container further comprises a pressure relief for release from the water collected therein of gasses.

17. The water purification and collection system as recited in claim 16, wherein said pressure relief comprises a check valve, said check valve being adapted to prevent introduction of contaminants to said storage container.

\* \* \* \* \*